Sept. 19, 1933.　　　　T. A. PEEBLES　　　　1,927,215
APPARATUS FOR UTILIZING AND CONTROLLING THE
THERMAL ENERGY IN HEATING SYSTEMS
Filed Sept. 26, 1931　　　2 Sheets-Sheet 1

INVENTOR
Thomas A. Peebles
By Green & McCallister
His Attorneys

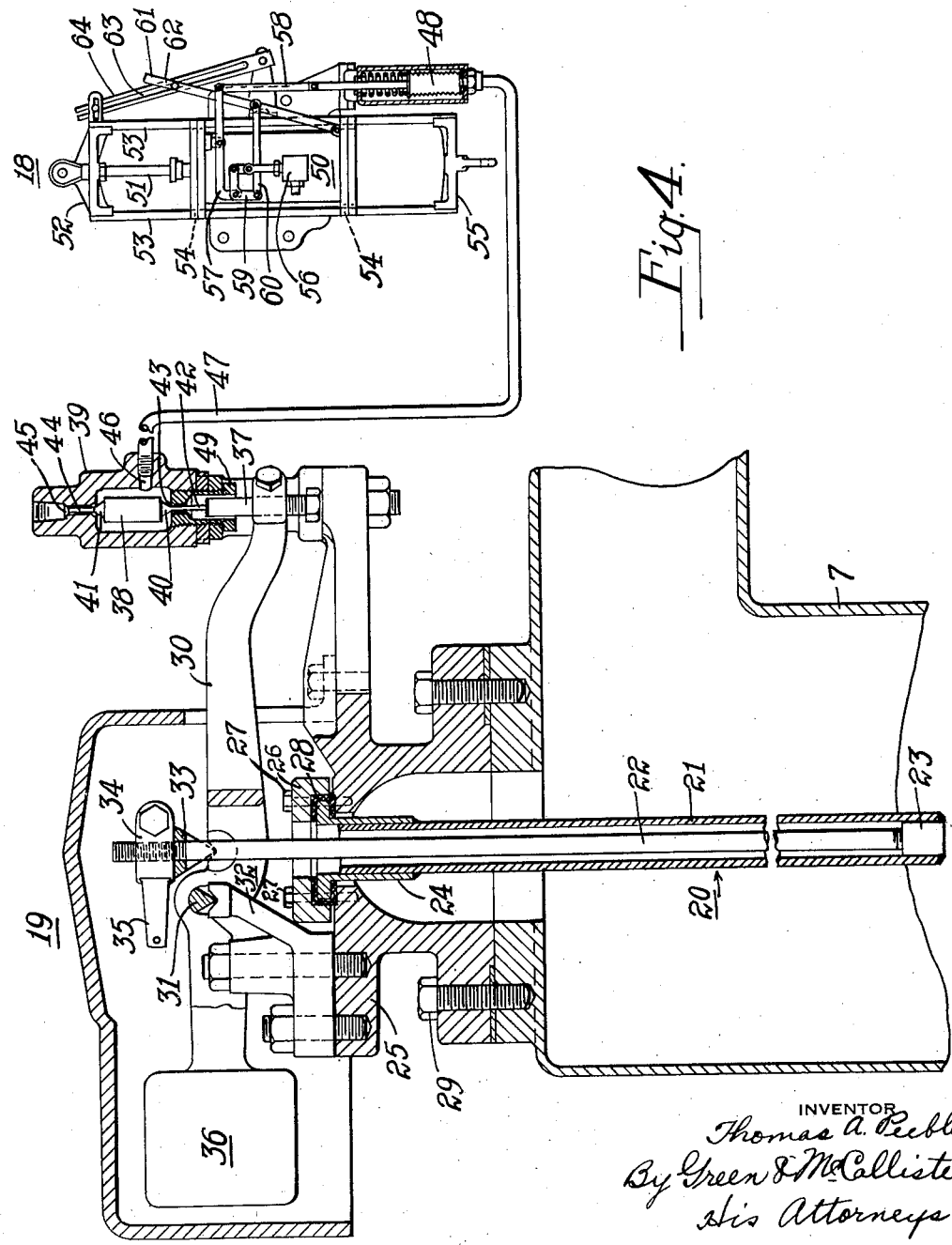

Patented Sept. 19, 1933

1,927,215

UNITED STATES PATENT OFFICE 1,927,215

APPARATUS FOR UTILIZING AND CONTROLLING THE THERMAL ENERGY IN HEATING SYSTEMS

Thomas A. Peebles, Mount Lebanon, Pa., assignor to John M. Hopwood, Dormont, Pa.

Application September 26, 1931
Serial No. 565,366

4 Claims. (Cl. 110—56)

In many heating operations two or more predetermined conditions must be obtained by the use of the same heating medium to successfully bring about these conditions.

In metallurgical furnaces it is often desirable to heat a given quantity of material to a predetermined condition and subsequently utilize the heated gases from the furnace to preheat the air required for combustion.

In boiler furnaces a given quantity of water must be evaporated and the resultant steam superheated to a specified or predetermined temperature. In such operations, the heat evolved in the furnace must be regulated to suit the primary requirements whether or not the amount of heat thereby made available for subsequent operations is correct for the attainment of the desired condition. For instance, in the operation of a steam boiler, the quantity of heat generated in the furnace must be regulated in accordance with the demand for steam, but the quantity of heat reaching the super-heater may not be the correct amount required to superheat the steam to the desired temperature. Also, in a heating furnace the heat must be regulated in accordance with the requirement of the material to be heated, regardless of the extent to which the heat available for the preheater will raise the temperature of the air used for combustion. In each case, however, the correct primary result must be secured regardless of undesirable variations in secondary results which may follow.

This invention has for its object the attainment of the desired secondary result without departing from those conditions most favorable for securing the primary results.

Other objects of the invention will, in part, be apparent, and will, in part, be obvious from the following description taken in conjunction with the accompanying drawings in which:—

Figure 1:
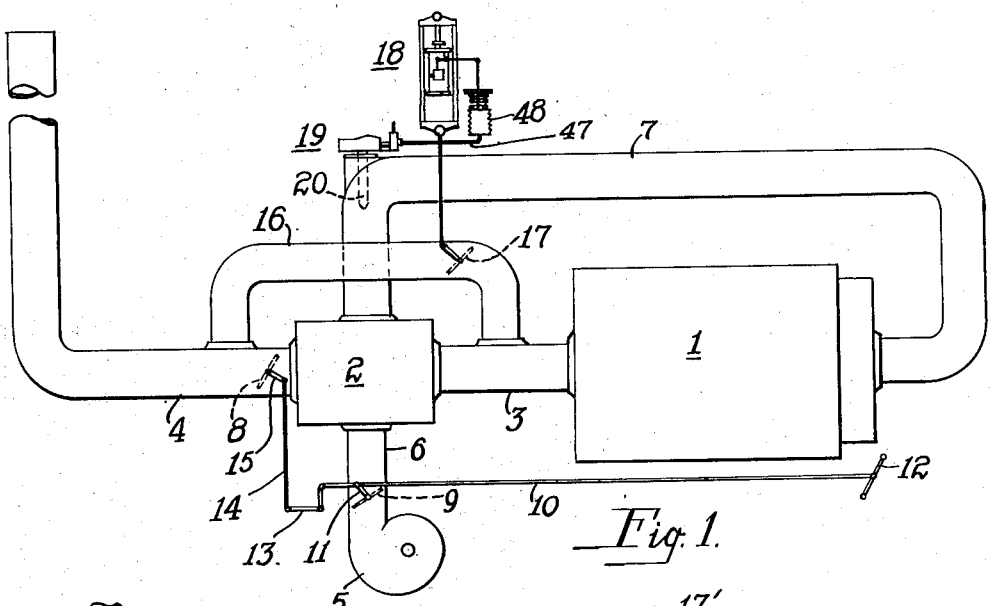
Figure 1 is a schematic illustration of a furnace and a preheater, and apparatus for controlling or regulating the amount of gases discharging from the furnace through the preheater in accordance with predetermined temperature conditions to be maintained in the preheated air sent to the furnace for combustion purposes.
Figure 2:
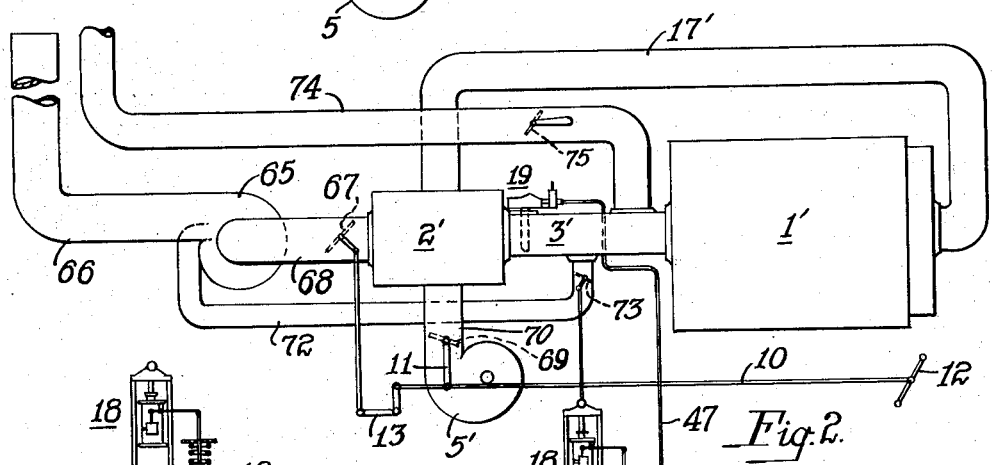
Fig. 2 is a diagrammatic illustration of a furnace, preheater, and apparatus for regulating the temperature of the gases entering the preheater.
Figure 3:
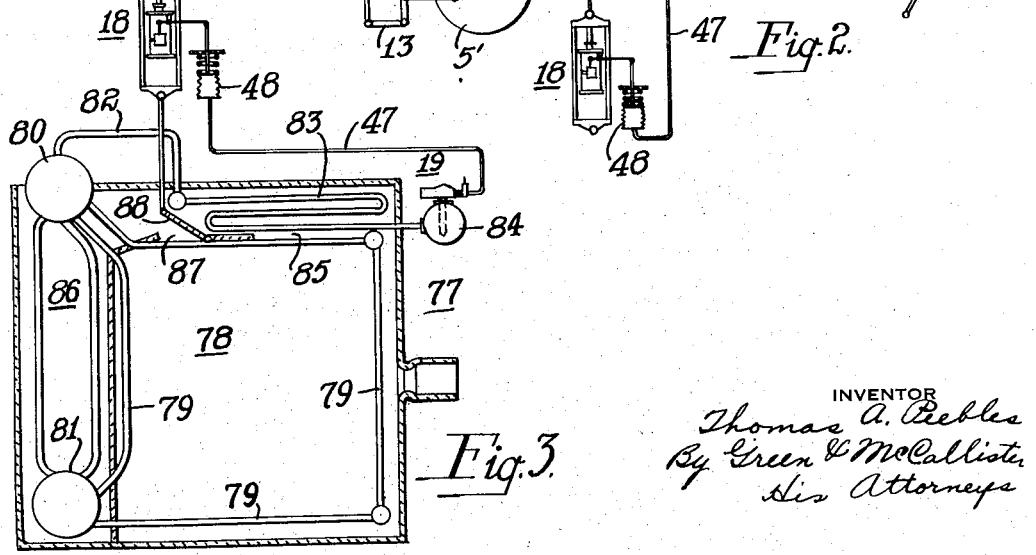

Fig. 3 is a diagrammatic view of a furnace, partly in section, in which the furnace is provided with a superheater, and means for regulating the flow of hot furnace gases over the superheater in accordance with a predetermined condition of superheat to be maintained in the steamline to which steam is sent from the furnace; and Fig. 4 is a view in section of a temperature control device and a regulator governed thereby for carrying into effect such temperature control conditions in the furnaces illustrated in Figures 1, 2, and 3.

Throughout the drawings and the specification, like reference characters indicate like parts.

In Figure 1 of the drawings, a primary heater or furnace 1 and a secondary or auxiliary heater 2 are shown. The secondary or auxiliary heater 2 may, as shown, be a preheater utilized to preheat air required for combustion by the primary heater or furnace. The gases of combustion discharging from the primary heater or furnace flow through a conduit 3 into the preheater from which they flow to a conduit 4 which leads to a stack (not shown). Air for combustion, supplied by a forced-draft fan 5, flows through a conduit 6 into the preheater from which it discharges into a conduit 7 that delivers the heated air to the furnace at a point where it is mixed with fuel in the usual manner.

In order that the amount of air supplied to the furnace by forced-draft fan 5 may be regulated in accordance with the amount of gases of combustion discharging from the furnace through conduit 4, dampers 8 and 9 are placed in conduits 4 and 6. These dampers are operated by appropriate linkages or mechanisms so that, as one damper is shifted towards the open position, the other is shifted a proportionate amount the same direction. The linkage for operating dampers 8 and 9 may comprise a rod 10 which is attached to an arm 11 of damper 9, the rod being operated back and forth by a lever 12. Rod 10 is attached to a bellcrank 13 which in turn is attached by means of a link 14 to an arm 15 of damper 8. Thus, as lever 12 is moved back and forth on its pivot, dampers 8 and 9 will open or close simultaneously and maintain a predetermined relation between the amount of air, delivered by forced-draft fan 5 through the preheater to the furnace, and the amount of gases discharging from the furnace through conduit 3 to preheater 2.

As illustrated, dampers 8 and 9 are arranged for manual operation, however, it will be appreciated that automatic control means may be utilized for operating either or both of these dampers in accordance with some variable condition to be controlled.

In the operation of a furnace, such as shown in Fig. 1, it may be important to regulate the temperature to which the air for combustion, passing through the preheater, is heated. When such is the case, it often happens that under certain conditions of operation there will be an excess of hot gases discharging from the furnace, and that such excess may be much greater than is required to maintain the temperature of the preheated air supplied to the furnace at some predetermined constant value. Therefore, in order to take care of such a condition, a bypass 16 is provided which is communicatively connected to conduits 3 and 4 at the inlet and outlet sides of the preheater. To regulate the amount of gases passed or shunted through bypass 16, and thereby to control the division of gases between the preheater and the bypass, a damper 17 is placed in the bypass. The bypass damper, as shown, is operated by a regulator 18, the operation of which is under the control of a thermostatic device 19. The thermostatic device 19 and the regulator 18 are shown in detail in Fig. 4 of the drawings.

The thermal element 20 of the thermostatic device is disposed within conduit 7 which carries the preheated air to the furnace. Thus, the thermostatic device will so regulate or control the operation of regulator 18, that such division of gases between the bypass and the preheater will be maintained as to effect a substantially constant temperature in the preheated air delivered to the furnace.

Thus, as the temperature of the preheated air flowing through conduit 7 varies or departs from a predetermined value, temperature responsive device 19 will operate to effect such movement of regulator 18, that the damper 17 in the bypass will be shifted or adjusted to that position in which the proper amount of hot gases flowing from the furnace, will be discharged through the bypass, to insure that a predetermined constant temperature will be maintained in the preheated air delivered to the furnace.

The particular form of thermostatic device and regulator employed for operating bypass damper 17 is illustrated and described in a copending application filed by George W. Smith on the 7th day of March, 1931, which application is serially numbered 520,949, and assigned to John M. Hopwood. The construction and operation of the thermostatic device and the regulator controlled thereby will be described more fully hereinafter.

In order to secure the desired results, so far as the maintenance of a predetermined temperature in the air flowing from the preheater to the furnace, preheater 2 is made of such size and capacity that even under its most unfavorable operating conditions, it will be able to preheat the incoming air to at least the maximum temperature that may be desired. Therefore, under normal conditions, there will be an excess of capacity in the preheater and its performance will be controlled by the regulation of the flow of hot gases through the bypass 16.

It will be apparent that for each change in the rate of combustion in furnace 1, there will be a corresponding change in the rate of air flow through the preheater so that a relation exists between the hot gases available for preheating purposes and the amount of air to be heated by the preheater. A certain measure of self-regulation, therefore, obtains; but since the temperature of the gases leaving the furnace may vary considerably for different conditions of furnace operation, some further regulation is necessary. This is accomplished by making the preheater of ample size and capacity for its most unfavorable condition of operation, and then permitting a certain amount of the waste gases to bypass the heater, allowing only such amounts to pass through the heater as will secure the desired results.

Temperature-responsive device 19 comprises a tubular element 21 having a relatively high thermal coefficient of expansion and a rod 22 having a relatively low thermal coefficient of expansion disposed interiorly of the tubular element. Rod 22 is anchored at one end to one end of the tubular element by means of a plug 23 which is welded or otherwise secured to the tubular element. The other end of the tubular element is secured within a bushing 24 which is mounted on a base 25 and secured thereto by means of a cap 26 and bolts 27. Suitable packing, such as indicated at 28, may be interposed between the bushing 24, cap 26 and base 25 in order to insure a gas-tight joint. The base is secured to conduit 16 by means of screws 29, as shown in Fig. 4.

When the thermostatic device is mounted in place on conduit 16, thermal element 21 and rod 22 extend into the conduit in the path of flow of the hot gases, thus as the temperature of the gases vary, the thermal element 21 either expands or contracts, according to the direction in which the temperature change takes place, and moves the rod accordingly.

The movement of rod 22 is utilized for operating a lever 30 which is provided with a knife edge 31 that bears on a fulcrum 32 secured to base 25. A knife edge 33 extends across the top edge of lever 30 at a point to the right of knife edge 31 and is operatively connected to rod 22 by means of an adjustable nut 34 having a wing 35 thereon to facilitate turning thereof. Thus when thermal element 21 expands and carries rod 22 with it, knife edge 33 exerts a force on lever 30 causing it to turn clockwise on knife edge 31.

The end of lever 30, to the left of knife edge 31, is provided with a counterweight 36 that causes the lever to follow the movements of the knife edge 33 as rod 22 moves in response to the changes in length of tubular element 21 occasioned by changes of temperature within conduit 16.

The opposite end of lever 30 carries an adjustable stud 37 for operating a valve 38 disposed in a valve body 39. Valve 38 is substantially cylindrical in form and is provided at each end with valve portions 40 and 41. Valve portion 40 is provided with an extension 42 that extends through an exhaust port 43 of the valve body and bears upon the upper end of stud 37. Valve portion 40 controls the flow of air through port 43 to the atmosphere.

Portion 41 of the valve is provided with an extension 44 that extends into an inlet port 45 through which air from a source of supply enters for operating regulator 18. The air entering the valve body, is transmitted through a port 46 into a conduit 47 which carries the air to a pressure-responsive bellows 48 utilized to govern the direction and extent of travel of the regulator.

When valve port 45 is closed by valve portion 41, air in line 47 exhausts through the valve body and the exhaust port 43 past stud 37 to the atmosphere, thus reducing the pressure in the pressure-responsive bellows 48 of the regulator.

When the pressure in the bellows is reduced, the regulator operates in such a direction as to close damper 17 disposed in the bypass 16.

When valve port 45 is uncovered and the valve port 43 is closed by valve portion 40, air or fluid at high pressure from the supply line is transmitted from pipe line 47 to the bellows 48 of the regulator. In response to such increase of pressure in the bellows, the regulator operates in such a direction that damper 17 in the bypass is shifted towards its open position.

If the position of valve 38 is such that both ports 43 and 45 are uncovered, the pressure of the air acting on the bellows will depend upon the relative restrictions at these ports. Thus, the pressure in the bellows may vary from atmospheric to the pressure of the air in the pressure supply line.

By making suitable adjustments in nut 34, stud 37, and a bushing 49 in which exhaust port 43 is formed, regulator 18 may be caused to operate in such manner that any predetermined temperature within the limits of operation of thermostatic device, may be established and controlled in conduit 16.

Regulator 18 comprises a cylinder 50 in which is disposed a piston (not shown) having a piston rod 51 attached thereto. The piston rod carries a cross head 52 from which side rods 53 depend. The side rods are guided in guideways 54 formed in the heads of the cylinders. The lower ends of the side rods are connected by a cross head 55 similar to the cross head 52.

A pilot valve 56 is mounted on the outside wall of the cylinder and is utilized for controlling the movement of the piston rod and its direction of travel. The pilot valve is connected to a source of pressure supply not shown and is so arranged that when moved in one direction air is admitted into the cylinder at one side of the piston, as for example the top side, causing the piston rod and the side rods to move downwardly. If the air is admitted to the other side of the piston, the piston rod and the side rod carried thereby will move in the opposite direction, upwardly for example.

The pilot valve is operated by a lever 57 connected by a link 58 to the bellows 48. One end of lever 57 carries a bell crank 59, one leg of which is connected to the stem of the pilot valve. The other leg of the bell crank is connected by a link 60 to a lever 61 which is pivotally mounted at the lower end of the cylinder. The upper end of lever 61 is provided with a pin 62 that operates in a slot 63 formed in an angling bar 64. The angling bar is mounted on one of side rods 53 and is adjustable as to angularity so as to control the angular travel of lever 61 for a given movement of the piston in the cylinder. The arrangement of the angling bar 64, lever 61 and bell crank 59 is such that whenever the valve is opened to cause the piston in the cylinder to travel in one direction or the other, the angling bar causes the lever to swing in such a direction that the bell crank is turned in the opposite direction to that in which it was turned by movement of the bellows 48. Thus with each incremental movement of the piston in the cylinder, the angling bar operates to close the valve and arrest further movement of the piston until the pressure in the bellows changes sufficiently to again actuate the valve to one or the other of its operative positions. After each operation of the pilot valve, the angling bar returns the valve to its neutral position. Thus incremental movement or step-by-step movement of the piston and the cross heads carried by the piston rod is attained.

Since a complete detailed description of the thermostatic device and the regulator controlled thereby is set forth in the aforementioned copending application of George W. Smith, it is thought that further detailed description of this apparatus is not here necessary.

In some furnace applications, the furnace temperature may be so high that the temperature of the exhaust gases of combustion will be such as to seriously damage or injure the materials of which the preheater is made. Preheaters, as usually constructed, comprise a series of pipes or tubes through which the air to be heated passes. The hot gases of combustion utilized for preheating the air passing through the tubes, pass over the outside surfaces of the tubes so that the thermal energy contained in these gases is transferred through the walls of the tube to the air flowing therethrough. In other cases, the preheaters embody a plurality of groups of metallic plates so arranged that the hot gases of combustion flow along one surface thereof and the air to be preheated flows on the opposite surfaces, thus the heat exchange takes place through the plates from one surface to the other. Since preheater constructions such as referred to are well known in the art it is believed unnecessary to show such constructions in detail.

Where the preheaters are composed either of a plurality of metallic pipes or plates arranged as mentioned above, the limit of temperature to which these elements may be exposed is determined by the materials of which the pipes or the plates are made. Therefore, the temperature of the gases of combustion passing through the preheater must be regulated in accordance with the maximum safe temperature to which the preheater elements may be heated.

In Fig. 2 of the drawings, an arrangement is shown whereby the temperature of the exhaust gases or products of combustion leaving the furnace is so regulated that the preheating elements will not be raised to injurious temperatures. The arrangement shown in Fig. 2 comprises a furnace 1′, a preheater 2′, such as illustrated in Fig. 1, and a forced draft fan 5′ which supplies air through the preheater from which it flows through a conduit 17′ to the furnace at the point where combustion takes place.

An induced draft fan 65 may be utilized for drawing the products of combustion through the preheater and passing them on through a conduit 66 to a stack not shown. A damper 67 is disposed in a conduit 68 connecting the discharge side of the preheater with the intake side of the induced draft fan. A damper 69 is also provided in a conduit 70 which connects the discharge side of the forced draft fan to the preheater. Dampers 67 and 69 are arranged for simultaneous operation by means of a rod 10 and suitable linkages such as shown and described in connection with dampers 8 and 9 of Fig. 1.

Dampers 67 and 69 of Fig. 2 may be operated manually, as indicated, or either or both of these dampers may be operated automatically by suitable control apparatus in accordance with some condition of furnace operation to be regulated or controlled.

In order to maintain the temperature of the gases of combustion, flowing into the preheater, within predetermined limits, a cooling medium such as cooled air or gas is mixed with the products of combustion flowing through conduit 3' thereby reducing the temperature of the products of combustion entering the preheater. The amount of cooling medium introduced into the conduit 3' is determined by the temperature of the products of combustion discharging from the furnace or primary heater.

Since the temperature of the gases of combustion discharging from induced draft fan 65 is materially lower than the temperature of the gases entering the preheater, it has been found that the gases of combustion discharging from the induced draft fan are convenient for the purpose of reducing the temperature of the gases of combustion in conduit 3' to a value such as will not injure the materials from which the heat exchanging elements in the preheater are made.

As shown in Fig. 2, a conduit 72 is connected to the interior of conduit 66 at the discharge or high pressure side of the induced draft fan 65 and to the interior of conduit 3' through which the hot gases of combustion pass to the preheater; thus the cooled gases are recirculated into the conduit 3' and mixed with the hot gases. The intermingling of the cooled gases and the hot gases results in a cooler mixture such as can be conveniently handled, with safety, by the materials of which the heat exchanging elements in the preheater are made.

A damper 73 is disposed in conduit 72 for regulating the quantity of cooled gases returned from conduit 66 to conduit 3. In order that the position of the damper may be adjusted in accordance with the temperature of the gases entering the preheater, a thermostatic device 19 and a regulator 18, such as shown in Fig. 4, are provided. Thus, as the temperature of the gases entering preheater 3' vary, damper 73 will be operated in accordance with such variations to regulate the amount of cooled gases returned to conduit 3'.

By operating the dampers 67 and 69 in unison or in some other manner, so that the flow of air through the preheater is proportional to the flow of furnace gases therethrough, the desired preheated air temperature can be secured so long as the temperature of the gases entering the preheater is maintained substantially constant. Each change in the rate of combustion in the furnace requires a corresponding change in the amount of preheated air used for combustion, and will result in a corresponding change in the quantity of products of combustion discharging from the furnace. Therefore, there is a general tendency for the temperature of the gases discharging from the preheater to remain fairly constant and by so regulating the amount of cooled gases delivered from the discharge side of the induced draft fan into conduit 3' that the temperature of the gases entering the preheater is uniform, uniform preheating of air for combustion purposes may be secured.

Under certain conditions of operation, such a quantity of cooled gases may be returned to the conduit 3' via conduit 72 that the induced draft fan may not be able to handle the combined volume of gases leaving the furnace and the volume returned to conduit 3'. A bypass conduit 74 is, therefore, provided so that by proper manipulation of a damper 75 therein, the excess quantity of gases of combustion may be shunted around the preheater. The damper 75 in bypass 74 may be adjusted to maintain a predetermined suction pressure in conduit 3' or at some point in the furnace. Thus by manipulating damper 75 in such manner that the suction in conduit 3', or at some point within the furnace, is maintained at substantially a constant predetermined value, the amount of gases sent through bypass 74 may be regulated to suit operating conditions.

In case automatic adjustment of damper 75 is desired in order to maintain the suction in conduit 3, or at some point within the furnace, constant at some predetermined value, a balanced float regulator, such as disclosed in my United States Letters Patent No. 1,800,400, dated April 14, 1931, and regulator 18 may be utilized.

In Fig. 3 of the drawings, a boiler furnace 77 is illustrated to which the invention may be applied. The furnace includes the usual combustion chamber 78 which is provided with water tubes 79, disposed along the side walls of the chamber, which are connected to upper and lower water drums 80 and 81. The water tubes absorb heat developed in the combustion chamber, and the heat thus absorbed converts water into steam. The steam which accumulates in the upper water drum flows through a pipe 82 into a superheater 83 disposed above the furnace combustion chamber. The steam from the superheater flows into a main steam header 84 from which steam utilizing devices receive the necessary steam required for their operation.

As shown in Fig. 3 of the drawings, the hot gases of combustion rise upwardly within the furnace combustion chamber and flow through an opening or port 85 across the superheater and then downwardly into a chamber 86 in which water tubes are disposed that provide additional heating or economizing surface.

The amount of steam generated by the boiler and which must be superheated in the superheater will, in general, vary in direct proportion with the weight of the products of combustion discharging from the furnace. As the rate of combustion increases, however, the temperature of the gases discharging from the furnace chamber 78 and flowing across the superheater, are raised materially, resulting in a general tendency to cause the superheat to increase as the rate of steam generation increases.

Therefore, in order to correct for such a condition and thereby prevent excessive superheating of the steam, a bypass 87 having a damper 88 therein is arranged in the furnace baffling which serves to carry hot gases of combustion away from the superheater 83. Thus by regulating damper 88 in accordance with the temperature of the steam in main header 84, the degree of superheat in the steam may be regulated and maintained substantially constant at some predetermined value.

To control the position of damper 88 automatically in accordance with the temperature of the steam in the main header 84, a regulator 18 and a thermostatic device 19, such as described in connection with Fig. 4 of the drawings, may be utilized and mounted as shown in Fig. 3. Thus, by adjusting the thermostatic device mounted on the main header to operate between predetermined minimum and maximum temperatures, regulator 18 will operate to so adjust the position of bypass damper 88 that the temperature of the steam in header 84 will be substantially constant.

From the above description it will be apparent that a heating system is disclosed which includes a primary heater wherein heat is generated and a part of such heat absorbed. The remainder of the heat developed in the primary heater is conveyed to an auxiliary heater wherein sufficient heat is absorbed to establish and maintain another thermal condition within predetermined limits. Bypasses are also provided for the disposal of excess thermal energy not required by the auxiliary heaters. By controlling the amount of thermal energy passed through the auxiliary heater and a bypass or bypasses, desired primary and secondary results may be attained.

In Figs. 1 and 2 the furnaces there shown may be considered as primary furnaces or heaters and the preheaters as auxiliary heaters. In Fig. 1 of the drawings the air utilized for combustion in the primary furnace is heated to a predetermined temperature, and the temperature of the air is maintained substantially constant at some predetermined value by controlling the amount of gas bypassed or circuited around the heaters. Thus in systems such as shown in Fig. 1, the primary object is to effect the required degree of heating of the contents of furnace 1, and the secondary object is to maintain the preheated air at some predetermined temperature and to maintain such temperature substantially constant for all conditions of furnace operation.

In Fig. 2 of the drawings, the temperature to which the air for combustion purposes is preheated may be of secondary importance whereas the regulation of the temperature of the gases of combustion flowing into and through the preheater may be of primary importance. In a furnace such as shown in Fig. 2, the maintenance of predetermined thermal conditions within the furnace or primary heater may be of prime importance regardless of what the temperature, of the gases of combustion leaving the furnace and entering the preheater, may be. However, the temperature of the gases entering and flowing through the preheater is of prime importance when the materials, of which the heat exchanging elements embodied in the preheater are made, are considered. If, under such conditions of furnace operation, the temperature of the gases entering the preheater are too high, provision is made for cooling such gases prior to their entry to the preheater. The excess gases of combustion, not needed for preheating purposes, are disposed by means of a bypass and the amount of gases so disposed of is regulated and controlled by means of the damper.

While several applications, to which the invention may be put, are illustrated it will be appreciated by those skilled in this art that various other applications may be made of the invention. It will also be apparent, to those skilled in this art, that various modifications and changes may be made in the method of heating and the system of control, without departing from the spirit or the scope of the invention. Therefore, it is desired that only such limitations shall be placed on the invention as are imposed by the prior art and the appended claims.

What I claim as new and desire to secure by Letters Patent is:

1. In a heating system, the combination with a primary heater in which thermal energy is developed by combustion of fuel and air, an auxiliary heater disposed to receive products of combustion from the primary heater, a source of air supply for the primary heater, and means for passing air from said source of supply through the auxiliary heater to preheat the same prior to its delivery to the primary heater, of a bypass connected to the primary heater in parallel relation to the auxiliary heater, means for regulating the temperature of the gases of combustion entering the auxiliary heater, and means for controlling the division of products of combustion between the auxiliary heater and the bypass.

2. In a heating system, the combination with a primary heater in which combustion takes place and an auxiliary heater disposed to receive hot gases of combustion from the primary heater, said auxiliary heater having material to be heated thereby, of a bypass having a damper therein arranged to shunt gases away from the auxiliary heater, a temperature-responsive device disposed in thermal communication with the material being heated by said auxiliary heater, and a regulator under the control of said temperature-responsive device for actuating said damper in accordance with the thermal condition of the material being heated by said auxiliary heater, thereby to control the quantity of gases of combustion shunted away from said auxiliary heater.

3. In a heating system, the combination with a primary heater in which combustion takes place, a forced draft fan for supplying air to said primary heater, a preheater connected to said primary heater through which gases of combustion flow, for preheating the air delivered by said fan to said primary heater, a damper between said preheater and said forced draft fan, an induced draft fan connected to the outlet of said preheater for drawing gases of combustion therefrom, a damper between said induced draft fan and said preheater, a conduit connected to the outlet side of said induced draft fan and to the inlet side of said preheater, said conduit being arranged to carry cooled gases of combustion into the stream of hot gases entering the preheater to cool the same, a damper in said conduit, a regulator for operating said damper, and a thermostatic regulator responsive to the temperature of the gases entering said preheater for controlling the operation of said regulator.

4. In a heating system, the combination with a primary heater in which combustion takes place, a forced draft fan for supplying air for combustion purposes to said primary heater, a preheater connected to said primary heater through which gases of combustion flow, for preheating the air delivered to said primary heater, a damper disposed between said forced draft fan and said preheater, an induced draft fan connected to the outlet side of said preheater for drawing gases of combustion therefrom, a damper disposed between said induced draft fan and said preheater, a conduit connected to the outlet of said induced draft fan and to the inlet side of said preheater, said conduit being arranged to carry cooled gases of combustion into the stream of hot gases entering the preheater to cool the same, a damper in said conduit, a regulator for operating said conduit damper, a thermostatic regulator responsive to the temperature of the gases entering said preheater for controlling the operation of said regulator, a bypass connected across said preheater and a damper in the bypass for controlling the division of the gases of combustion from said primary heater between said bypass and the preheater.

THOMAS A. PEEBLES.